(12) United States Patent
van de Rovaart et al.

(10) Patent No.: US 9,227,596 B2
(45) Date of Patent: Jan. 5, 2016

(54) SUPPORT ELEMENT FOR A WIPER DRIVE

(71) Applicant: Robert Bosch GmbH, Stuttgart (DE)

(72) Inventors: Robert-Jan van de Rovaart, Buehl-Neusatz (DE); Barnabas Bencsik, Val (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/369,988

(22) PCT Filed: Dec. 20, 2012

(86) PCT No.: PCT/EP2012/076384
§ 371 (c)(1),
(2) Date: Jun. 30, 2014

(87) PCT Pub. No.: WO2013/098187
PCT Pub. Date: Jul. 4, 2013

(65) Prior Publication Data
US 2015/0014513 A1    Jan. 15, 2015

(30) Foreign Application Priority Data

Dec. 30, 2011 (DE) .......................... 10 2011 090 155

(51) Int. Cl.
A47L 1/00 (2006.01)
B60S 1/02 (2006.01)
B60S 1/04 (2006.01)

(52) U.S. Cl.
CPC ............. B60S 1/0441 (2013.01); B60S 1/0438 (2013.01); B60S 1/0488 (2013.01); *B60S 1/0444* (2013.01)

(58) Field of Classification Search
CPC ...... B60S 1/0488; B60S 1/043; B60S 1/0436; B60S 1/0438; B60S 1/0441

USPC ............. 15/250.31, 250.001, 250.3; 248/544, 248/548, 592, 637, 672, 674, 200; 296/96.15, 96.16, 96.17
See application file for complete search history.

(56) References Cited

U.S. PATENT DOCUMENTS 5,441,227 A * 8/1995 Hayashi ...................... 248/274.1
6,216,309 B1 * 4/2001 Goto et al. .................. 15/250.31
(Continued)

FOREIGN PATENT DOCUMENTS

CN    1655974    8/2005
CN    1684862    10/2005
(Continued)

OTHER PUBLICATIONS

International Search Report for Application No. PCT/EP2012/076384 dated Feb. 28, 2013 (English Translation, 3 pages).

*Primary Examiner* — Terrell McKinnon
*Assistant Examiner* — Michael McDuffie
(74) *Attorney, Agent, or Firm* — Michael Best & Friedrich LLP

(57) ABSTRACT

The invention relates to a support element (105) for a wiper drive (100), comprising a receiving portion (130) for attaching the wiper drive (100), a bearing point (135) for fixing the support element (105) to a surrounding structure (110), and a predetermined breaking point (140). A specified gap (150) lies between the support element (105) and the surrounding structure (110) at a contact portion (142) of the support element (105), the width of said gap being dependent on a force that acts on the support element (105) such that the contact portion (142) comes into contact with the surrounding structure (110) only when a specified force acting on the support element (105) is exceeded.

18 Claims, 4 Drawing Sheets

(56) References Cited

U.S. PATENT DOCUMENTS

| | | | |
|---|---|---|---|
| 6,421,873 B1 * | 7/2002 | Zimmer | 15/250.3 |
| 6,701,569 B1 | 3/2004 | Benner | |
| 6,793,396 B2 * | 9/2004 | Zimmer | 384/247 |
| 6,854,154 B2 * | 2/2005 | Masuda | 15/250.31 |
| 7,805,799 B2 * | 10/2010 | Reid et al. | 15/250.31 |
| 8,234,746 B2 * | 8/2012 | Lutterodt et al. | 15/250.3 |
| 2001/0011831 A1 * | 8/2001 | Ohashi et al. | 296/96.17 |
| 2003/0001407 A1 * | 1/2003 | Hoshikawa et al. | 296/96.15 |
| 2007/0163068 A1 * | 7/2007 | Kraus et al. | 15/250.31 |
| 2008/0276401 A1 * | 11/2008 | Renius et al. | 15/250.3 |
| 2008/0313839 A1 * | 12/2008 | Kraus et al. | 15/250.31 |
| 2010/0032542 A1 * | 2/2010 | Heitkamp et al. | 248/548 |
| 2013/0111690 A1 * | 5/2013 | Murata et al. | 15/250.31 |

FOREIGN PATENT DOCUMENTS

| | | |
|---|---|---|
| CN | 201317346 | 9/2009 |
| DE | 19833488 | 1/1999 |
| EP | 1155931 | 11/2001 |
| JP | 2000326829 | 11/2000 |
| WO | 2008028678 | 3/2008 |

* cited by examiner

SUPPORT ELEMENT FOR A WIPER DRIVE

BACKGROUND OF THE INVENTION

The invention relates to a support element or a motor bracket for a wiper drive. The invention particularly relates to a support element for a wiper drive of a wiper system in a motor vehicle.

A wiper system comprises a wiper arm and a wiper blade, wherein the wiper arm is set into a pivoting movement about a driven shaft by means of a wiper drive; thus enabling the wiper blade to be guided across a wiping region of a window pane. The window pane can particularly be a windshield of a motor vehicle. The wiper drive is usually attached to a body of the motor vehicle, wherein the attachment must be able to transfer forces to the body that are usual during normal operation. Besides the usual wiping forces, said forces also include peak loads, for example if the wiper blade is moved against an obstacle during wiping, when the wiper arm is being folded down onto or folded back from the window pane or within the scope of changing the wiper blade.

Were the motor vehicle to collide with a person, in particular a pedestrian, a substantial risk of injury can occur to the pedestrian if, for example, his or her head strikes against the wiper shaft of the drive device. In order to reduce the risk of injury to the person during such an impact as much as possible, different measures are taken. One measure relates to lowering the wiper shaft in the event of excessive axial load.

To this end, the drive device is fixed to the body by means of a support element, also referred to as motor bracket, wherein the support element comprises one or a plurality of predetermined breaking points which are set up to break when a predetermined force or energy is exceeded. In so doing, the drive device comprising the wiper shaft and, as the case may be, portions of the wiper arm can drop down below the original installation position thereof and thus be moved out of a danger zone for the affected person.

In order to assess a health risk to the person as a result of the impact during collision, parameters are determined which are summarized in the so-called HIC value (head injury criteria). The force acting on the drive device in order to cause a release of the predetermined breaking point is one of these parameters. Said parameters also include the time delay between the introduction of the force and the breaking of the predetermined breaking point.

In order to better protect the person involved in the accident from the wiper system, it is the aim of the invention to specify a support element comprising a predetermined breaking point, wherein the support element is configured in such a way that the HIC value is positively influenced.

SUMMARY OF THE INVENTION

An inventive support element for a wiper drive comprises a receiving portion for attaching the wiper drive to the support element, a bearing point for fixing the support element to a surrounding structure and a predetermined breaking point. A specified gap lies between the support element and the surrounding structure at a contact portion of the support element, the width of said gap being dependent on a force that acts on the support element such that the contact portion comes into contact with the surrounding structure only when a specified force acting on the support element is exceeded.

If a load acts on the wiper drive which is sufficiently large to close the gap, an improved force transfer having reduced elasticity can thus also be achieved as a result of the contact of the support element with the surrounding structure. Said improved force transfer allows the breakage behavior of the support element to be controlled in an improved manner at the predetermined breaking point. To this end, the predetermined breaking point must not be designed for a lower load, whereby the support element would usually be weakened even during normal operation. In addition, a latency time between the introduction of the force and the breaking of the support element at the predetermined breaking point can also be reduced by the device described; thus enabling an energy absorbed by the support element to be reduced when the breaking load occurs.

In a preferred embodiment, a projection is formed on the contact portion, which projection extends in the direction of the surrounding structure. As a result, the width of the gap on the part of the support element can be determined in the unloaded state. If need be, the projection can be easily adapted in the dimensions thereof to predetermined requirements, in particular to different motor vehicles.

In another embodiment, which can be combined with the aforementioned embodiment, the projection can also be disposed on the surrounding structure. In this case, the projection preferably extends from the surrounding structure in the direction of the support element.

In a further embodiment, the projection lies off-center in the region of the contact portion in order to exert a torsional force on the support element upon contact between the support element and the surrounding structure. In addition to the bending force, the torsional force can act on the predetermined breaking point; thus enabling the breakage behavior at the predetermined breaking point to be even better controlled by means of the torsional load which does not occur during normal operation.

An off-center recess that lies opposite to the projection can also be provided in the region of the contact portion in order to allow a torsion at the support element. A torsional angle of the support element in the region of the contact portion and if need be in the region of the predetermined breaking point can thus be enlarged.

In one embodiment, the projection extends transversely over the entire support element. In so doing, the gap along the projection can have a constant width or decrease in size, whereby the aforementioned effect of the additional torsional force can be achieved.

The abutment region preferably lies between the predetermined breaking point and the fastening element. Effective levers at the support element, in particular with regard to the receiving portion for the wiper drive, can thus be advantageously used. In addition, the definition of the gap can be facilitated by a smaller distance between the contact region and the bearing point.

In a preferred embodiment, the support element has a specified elastic deformability. The dependence of the width of the gap on the force acting on the support element or, respectively, the wiper drive can thereby be defined.

In one embodiment, an elastic element or a decoupling element is provided to engage between the bearing point and the surrounding structure. As a result, the transmission of structure-borne noise between the support element and the surrounding structure can be reduced. Furthermore, the definition of the width of the gap can simultaneously be influenced by the elasticity at the bearing point.

In one variant, the support element is integrally designed with the wiper drive. For example, the support element can be part of a housing of the wiper drive.

BRIEF DESCRIPTION OF THE DRAWINGS

The invention is now described in more detail with reference to the attached drawings. In the drawings.

DETAILED DESCRIPTION

Figure 1:
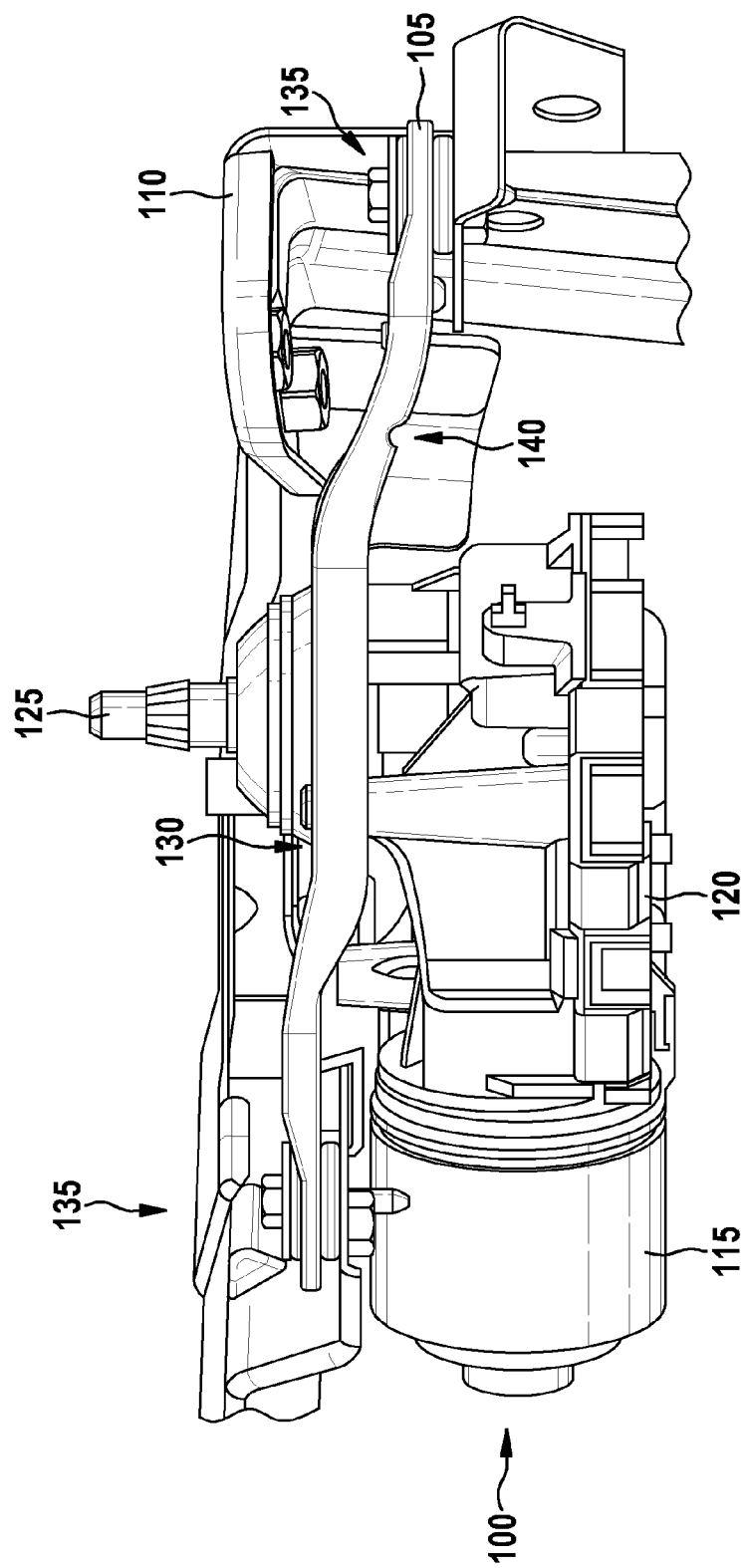
FIG. 1 shows a wiper drive at a support element of a motor vehicle.

FIG. 1 shows a wiper drive 100 which is connected by means of a support element 105, a so-called board, to a body panel 110 of a motor vehicle. In alternative applications, any other surrounding structure, which typically is found on a motor vehicle in the region of a supporting structure, can also be used instead of the body panel 110. The wiper drive 100 comprises an electric motor 115, a housing 120 and a driven shaft 125. The support element 105 comprises a receiving portion 130 for attaching the wiper drive 100, at least two bearing points 135 for fixing the support element 105 to the body panel 110 and a predetermined breaking point 140. One of the bearing points 135 can be a plug-in point for insertion into a corresponding recess in the body panel 110 and another bearing point 135 can be a fixing point for fixing the support element, for example, by means of a screw or a similar means. A plurality of plug-in and/or fixing points can also be provided.

The support element can preferably be manufactured from a plastic material. An arm of the support element 105, on which the predetermined breaking point 140 is arranged, extends between the wiper drive 100 and the right bearing point 135. The predetermined breaking point 140 is formed by one or a plurality of targeted attenuations of the structure of the support element 105.

Figure 2:
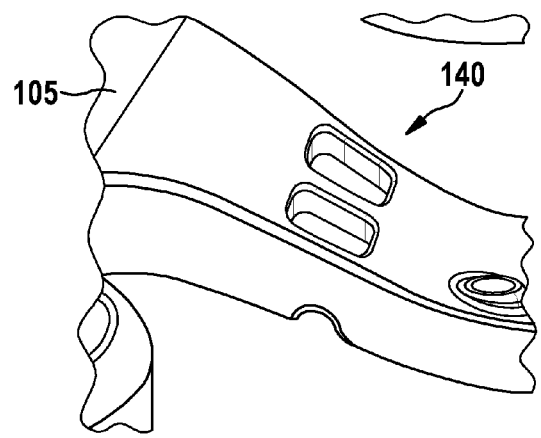
FIG. 2 shows a portion of the support element of the wiper drive from FIG. 1.

FIG. 2 shows a portion of the support element 105 of the wiper drive 100 from FIG. 1. It can be seen that the support element 105 has a substantially U-shaped cross section in the region of the predetermined breaking point 140 and that the predetermined breaking point 140 is formed by recesses at the different portions of the profile. The support element 105 is preferably elastic to some degree so that said support element 105 breaks at the predetermined breaking point 140 only when a force acting on the drive device 100, in particular the wiper shaft 125, has already deformed the support element 105 by a predetermined amount.

Figure 3:
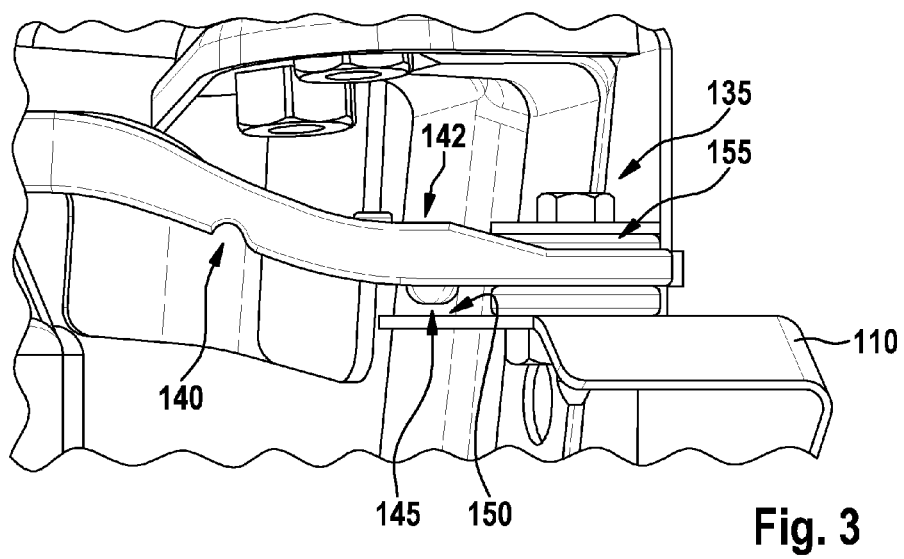
FIG. 3 shows a projection on the support element of the preceding figures.

FIG. 3 shows a projection 145 on the support element 105 of the preceding figures. A contact portion 142, from which a projection 145 protrudes downwards, lies between the predetermined breaking point 140 and the bearing point 135 on the arm-shaped extension of the support element 105 at the right bearing point 135. The projection 145 points from the support element 105 in the direction of the body panel 110. A gap 150 is defined between the contact portion 142 or the lower end of the projection 145 and the body panel 110.

An elastic element 155 is preferably provided at the bearing point 135 between the support element 105 and the body panel 110. If a force acts on the wiper drive 100, the support element 105 and the elastic element 155 deform. The greater the force is, in particular in the axial direction relative to the driven shaft 125, the smaller the gap 150 becomes. If the aforementioned force exceeds a predetermined value, the gap 150 is then reduced to zero, whereby the support element 105 lies firmly against the body panel 110. A breakage behavior of the support element 105 in the region of the predetermined breaking point 145, when a sufficiently large force is applied, can thereby be more easily controlled without excessively weakening said support element 105.

FIG. 4 shows variations of the projection 145 from FIG. 3. A cross section through the arm-shaped extension of the support element 105 up to the right bearing point 135 is depicted.

Figure 4A:
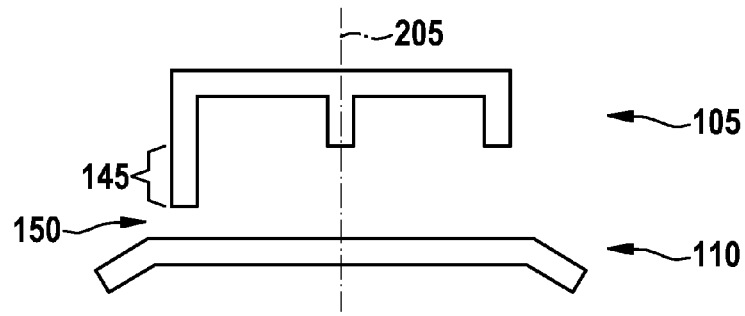
FIG. 4 shows variations of the projection from FIG. 3.

FIG. 4a shows a first variation of the projection 145. The profile of the support element 105 extends towards the left and right with respect to a center line 205. The depicted embodiment comprising a horizontal web, to which three downwardly protruding, vertical webs are attached, is purely presented by way of example, other embodiments are also possible. To the left of the center line 205, the projection 145 extends from the support element downwards towards the body panel 110. The projection can basically be formed at any desired position in relation to the center 205. The gap 150 is located between the lower end of the projection 145 and the body panel 110.

In the embodiment depicted, the projection 145 is located off-center with respect to the center line 205 so that the support element 105 is twisted in a clockwise direction if said support element 105 is moved so far in the direction of the body panel 110 that the gap 150 is entirely closed. In so doing, a torsional force is exerted on the support element 105, which can represent an additional force in the region of the predetermined breaking point 140 that does not occur in the usual operation and which leads to an abrupt breakage of the support element 105 at the predetermined breaking point 140.

Figure 4B:
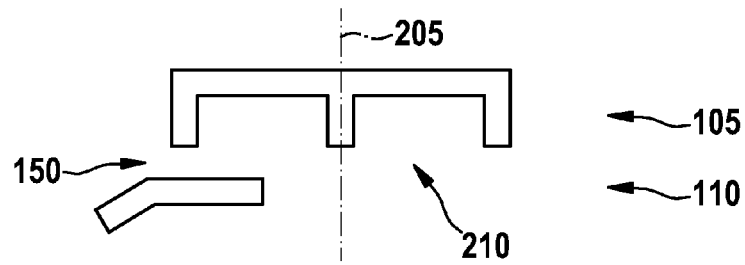

FIG. 4b shows an embodiment in which an additional projection 145 is not provided but a recess 210 in the body panel 110 in order to subject the support element 105 to a torsional stress as described in reference to FIG. 4a. The recess 210 can lie on either side of the center line 205. In a combination of this embodiment with the embodiment depicted in FIG. 4a, the projection 145 and the recess 210 can be situated opposite one another with respect to the center line 205.

Figure 4C:
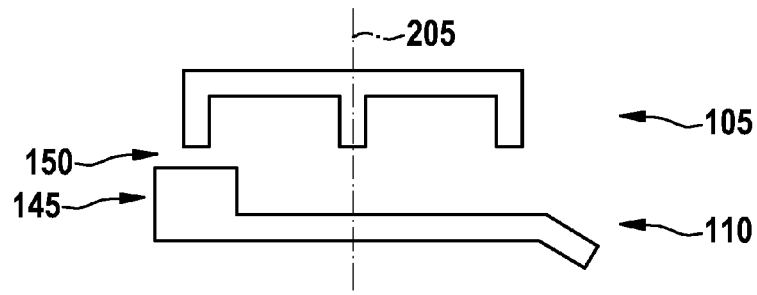

FIG. 4c shows an embodiment, in which the projection 145 is formed on the body panel 110. This embodiment can be combined with the other embodiments of FIG. 4; in particular a further projection 145 can be formed on the support element 105 which projection vertically faces the depicted projection 145 on the body panel 110. The two projections can also be situated opposite one another with respect to the center line 205 so that no or only a small torsional force is exerted on the support element 105.

Figure 4D:
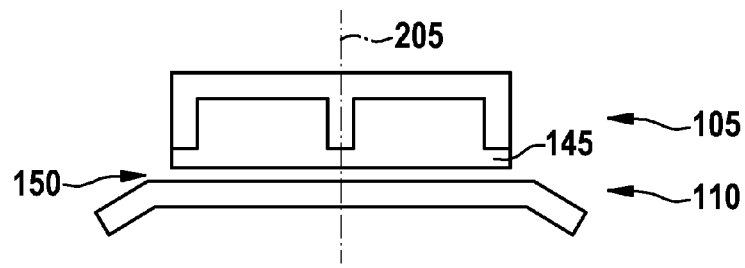

FIG. 4d shows an embodiment in which the projection 145 extends transversely across the entire width of the support element 105. This embodiment can also be combined with the other embodiments of FIG. 4. In one variant, the projection 145 can also be wedge-shaped so that the width of the gap 150 decreases or increases from left to right. In so doing, the torsional force previously described can be exerted on the support element 105.

As a general rule, the features depicted in FIGS. 4a to 4d and described above can alternatively be formed on the support element 105 or on the body panel 110. In addition, the features can be freely combined with each other.

Figure 5A:
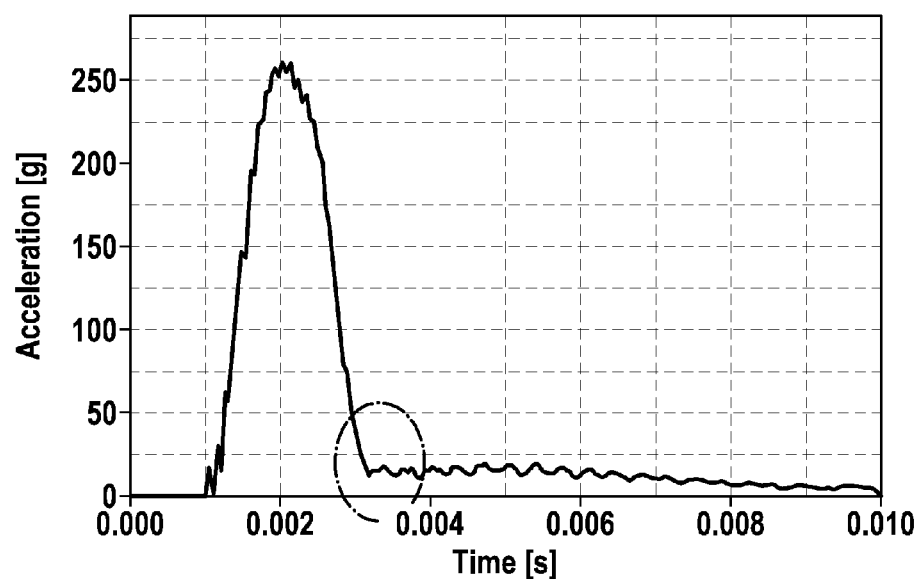
FIG. 5 shows diagrams of loads on the support element according to one of the preceding figures.
Figure 5B:
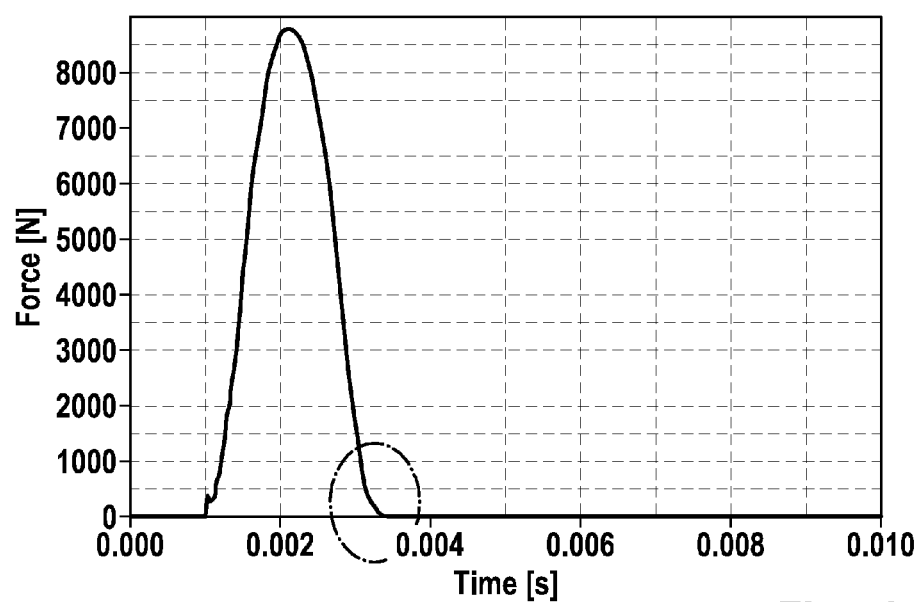

FIG. 5 shows diagrams of loads on the support element 105 pursuant to one of the FIGS. 1 to 4. Time is plotted in each case in the horizontal direction. In FIG. 5a, an acceleration in g units is plotted in the vertical direction; and a force in N is plotted in the vertical direction in FIG. 5b. The two depictions correspond to each other and describe the same breaking test.

At the point in time zero, a force is introduced into the wiper drive 100, said force lying above a predetermined breaking force which is sufficient to release the predetermined breaking point 140. Due to the elastic mounting of the wiper drive 100 by means of the support element 105 and to the elastic elements 155 at the bearing points 135 as well as to the elasticity of the support element 105 itself, force and acceleration increase in the region of the predetermined breaking point 140 only with a certain time delay at the point in time 1.5 ms. Subsequently force and acceleration increase abruptly until they achieve a maximum value at the point in time 2.1 ms. At this point in time, the support element 105 begins to break so that the values do not further increase. At the point in time 3.1 ms, force and acceleration have substantially subsided. The acceleration in FIG. 5a still oscillates in the further course thereof at low values which can be attributed to an oscillation of the broken off portion of the support element 105.

A surface area under the acceleration curve of FIG. 5a or the force curve of FIG. 5b is proportional to an energy which the support element 105 absorbs when the breaking load is applied. The smaller said surface area is in each case, the lower the energy is and the better the HIC value is. According to the invention, it is possible to reduce the size of said surface area by the support element breaking earlier and thus reducing the prevailing force or acceleration. In so doing, a peak load due to force or acceleration can in fact be increased by the contact portion 142 making contact with the body panel 110 although the surface integral is reduced.

The bending behavior and in particular the breakage behavior of the support element 105 are generally difficult to predict due to the numerous influencing factors. For instance, an elasticity of the support element 105 can be dependent on the age thereof, previous damage thereto by ultraviolet light, an ambient temperature, a manufacturing tolerance or an inhomogeneity of the material from which the support element 105 is manufactured. Due to the engagement of the contact portion 142 when subjected to breaking load, the breakage of the support element 105 can proceed in a better controlled manner. In particular, the breakage can take place under conditions that can be better reproduced; thus enabling said breakage to be introduced earlier and to be carried out quicker. In the case of a torsional force being additionally introduced into the support element 105, the breakage conditions can be quickly and reliably produced.

The invention claimed is:

1. A support element (105) for a wiper drive (100), comprising: a receiving portion (130) for attaching the wiper drive (100); and a bearing point (135) for fixing the support element (105) to a surrounding structure (110), wherein the support element (105) comprises a predetermined breaking point (140), characterized by a contact portion (142), wherein a specified gap (150) lies between the contact portion (142) and the surrounding structure (110), a width of said gap being dependent on a force that acts on the support element (105), such that the contact portion (142) comes into contact with the surrounding structure (110) only when a specified force acting on the support element (105) is exceeded, and wherein a projection (145) is formed on the contact portion (142), said projection extending in a direction of the surrounding structure (110), and wherein the support element (105) is configured to break at the predetermined breaking point (140) after a predetermined amount of deformation.

2. The support element (105) according to claim 1, wherein a projection (145) is formed on the surrounding structure (110), said projection extending in a direction of the support element (105).

3. The support element (105) according to claim 1, wherein the projection (145) lies off-center in a region of the contact portion (142) in order to exert a torsional force on the support element (105) when there is contact between the support element (105) and the surrounding structure.

4. The support element (105) according to claim 3, wherein an off-center recess that lies opposite the projection (145) is provided in the region of the contact portion (142) in order to allow a torsion of the support element (105).

5. The support element (105) according to claim 1, wherein the projection (145) extends transversely across the entire support element (105).

6. The support element (105) according to claim 1, wherein the contact portion (142) lies between the predetermined breaking point (140) and the bearing point (135).

7. The support element (105) according to claim 1, wherein the support element (105) has a specified elastic deformability.

8. The support element (105) according to claim 1, further comprising an elastic element (155) for engagement between the bearing point (135) and the surrounding structure (110).

9. The support element (105) according to claim 1, wherein the support element (105) is integral with the wiper drive (100).

10. The support element (105) according to claim 9, wherein the projection (145) is formed on the surrounding structure (110), said projection extending in a direction of the support element (105).

11. The support element (105) according to claim 10, wherein the projection (145) lies off-center in a region of the contact portion (142) in order to exert a torsional force on the support element (105) when there is contact between the support element (105) and the surrounding structure.

12. The support element (105) according to claim 11, wherein an off-center recess that lies opposite the projection (145) is provided in the region of the contact portion (142) in order to allow a torsion of the support element (105).

13. The support element (105) according to claim 12, wherein the projection (145) extends transversely across the entire support element (105).

14. The support element (105) according to claim 13, wherein the contact portion (142) lies between the predetermined breaking point (140) and the bearing point (135).

15. The support element (105) according to claim 14, wherein the support element (105) has a specified elastic deformability.

16. The support element (105) according to claim 15, further comprising an elastic element (155) for engagement between the bearing point (135) and the surrounding structure (110).

17. The support element (105) according to claim 16, wherein the support element (105) is integral with the wiper drive (100).

18. A support element (105) for a wiper drive (100), comprising: a receiving portion (130) for attaching the wiper drive (100); and a bearing point (135) for fixing the support element (105) to a surrounding structure (110), wherein the support element (105) comprises a predetermined breaking point (140), characterized by a contact portion (142), wherein a specified gap (150) lies between the contact portion (142) and the surrounding structure (110), a width of said gap being dependent on a force that acts on the support element (105), such that the contact portion (142) comes into contact with the surrounding structure (110) only when a specified force acting on the support element (105) is exceeded, and wherein a projection (145) is formed on the surrounding structure (110), said projection extending in a direction of the support element (105), and wherein the support element (105) is configured to break at the predetermined breaking point (140) after a predetermined amount of deformation.

\* \* \* \* \*